US012711226B2

(12) United States Patent
Deshpande et al.

(10) Patent No.: US 12,711,226 B2
(45) Date of Patent: Aug. 18, 2026

(54) SYSTEM AND METHODS FOR PROACTIVE THREAT DETECTION IN A SECURITY SYSTEM

(71) Applicant: Honeywell International Inc., Charlotte, NC (US)

(72) Inventors: Surekha Deshpande, Bangalore (IN); Balamurugan Ganesan, Bengaluru (IN)

(73) Assignee: HONEYWELL INTERNATONAL INC., Charlotte, NC (US)

( * ) Notice: Subject to any disclaimer, the term of this patent is extended or adjusted under 35 U.S.C. 154(b) by 79 days.

(21) Appl. No.: 18/663,593

(22) Filed: May 14, 2024

(65) Prior Publication Data

US 2025/0356001 A1 Nov. 20, 2025

(51) Int. Cl.
*G06F 21/55* (2013.01)
*G08B 13/24* (2006.01)

(52) U.S. Cl.
CPC ....... *G06F 21/554* (2013.01); *G08B 13/2494* (2013.01)

(58) Field of Classification Search
CPC .......................... G06F 21/554; G08B 13/2494
See application file for complete search history.

(56) References Cited

U.S. PATENT DOCUMENTS 8,779,921 B1 * 7/2014 Curtiss ................ G08B 25/009 340/541
9,269,250 B2 2/2016 Nickles et al.
11,755,751 B2 9/2023 Child et al.
11,822,650 B2 * 11/2023 Singh ...................... G06F 21/52
2017/0018167 A1 * 1/2017 Dey ....................... G08B 25/14
2019/0020669 A1 * 1/2019 Glatfelter ............ H04W 12/122
2019/0272730 A1 9/2019 Ragland et al.
2019/0355240 A1 11/2019 Razak et al.

(Continued)

FOREIGN PATENT DOCUMENTS

IN 20204103134 A 7/2020
IN 202311064606 A 10/2023

OTHER PUBLICATIONS

Igzy, "Perimeter Intrusion Detection System", 6 pages, 2023, Accessed Dec. 21, 2023.

(Continued)

*Primary Examiner* — Linglan Edwards
*Assistant Examiner* — Jacob Benedict Knackstedt
(74) *Attorney, Agent, or Firm* — Seager, Tufte & Wickhem, LLP

(57) ABSTRACT

Proactive threat detection in a security system includes monitoring user input received for operating the security system over time and establishing a baseline user input for operating the security system that produces a baseline operation of the security system that can monitor for and identify each of a plurality of baseline security events. An anomaly in the user input relative to the baseline user input is detected and a determination is made as to whether the anomaly means the security system is not able to identify one or more of the baseline security events. When the anomaly in the user input causes the security system to not be able to identify one or more of the baseline security events, a proactive threat detection alert is provided that prompts an operator to take action to resolve the anomaly.

19 Claims, 4 Drawing Sheets

(56) References Cited

U.S. PATENT DOCUMENTS

| | | | | |
|---|---|---|---|---|
| 2021/0182388 | A1* | 6/2021 | Myneni | G06N 5/04 |
| 2022/0021684 | A1* | 1/2022 | Mensah | H04L 63/105 |
| 2022/0377093 | A1* | 11/2022 | Crabtree | H04L 43/045 |
| 2023/0119190 | A1* | 4/2023 | Zachos | H04L 63/1458<br>726/22 |
| 2023/0171275 | A1* | 6/2023 | Valasek | H04L 12/40<br>726/23 |
| 2024/0119146 | A1* | 4/2024 | Paripally | G08B 13/19654 |
| 2024/0154990 | A1* | 5/2024 | Kim | H04L 63/1416 |

OTHER PUBLICATIONS

Extended European Search Report, EP Application No. 25172281.5, European Patent Office, Sep. 24, 2025 (10 pages).

* cited by examiner

SYSTEM AND METHODS FOR PROACTIVE THREAT DETECTION IN A SECURITY SYSTEM

TECHNICAL FIELD

The present disclosure relates generally to security systems, and more particularly to proactively detecting possible threats in a security system.

BACKGROUND

In commercial security systems, it is important that the individual security devices within the system function correctly, without interruption. Problems in the security system, such as but not limited to blocking or interfering with the functioning of a security sensor or a security camera can be problematic. Unplanned, non-routine activity in operating the security system can also lead to compromises in security. For example, if a sensor is blocked, bypassed or otherwise impaired in functionality, actual alarm events occurring in the facility may go unreported. What would be desired is a security system that can detect anomalous operation of the security system that prevents the security system from detecting at least some events in the facility, and in response, raise a proactive threat detection alert that prompts an operator to take action to resolve the anomaly.

SUMMARY

The present disclosure relates generally to security systems, and more particularly to proactive threat detection in a security system. An example may be found in a method for proactive threat detection in a security system of a facility, wherein the security system includes a controller operatively coupled to a plurality of sensors, wherein each of the plurality of sensors is for detecting a corresponding sensed event of the facility, wherein the controller is configured to identify security events of the facility based at least in part on the sensed events detected by the plurality of sensors. The controller is configured to receive user input for operating the security system, including arming and disarming the security system. The illustrative method includes monitoring over time the user input received for operating the security system and establishing a baseline user input for operating the security system, wherein the baseline user input produces a baseline operation of the security system that can monitor for and identify each of a plurality of baseline security events of the facility. An alarm is raised when the security system identifies one or more of the plurality of baseline security events of the facility. An anomaly in the user input relative to the baseline user input is detected and a determination is made as to whether the anomaly in the user input causes the security system to not be able to identify one or more of the plurality of baseline security events of the facility. When the anomaly in the user input causes the security system to not be able to identify one or more of the plurality of baseline security events, a proactive threat detection alert is provided.

Another example may be found in a security system for a facility. The security system includes a plurality of sensors each for detecting a corresponding sensed event of the facility, a user interface and a controller that is operatively coupled to the plurality of sensors and to the user interface. The controller is configured to receive user input via the user interface for operating the security system including arming and disarming the security system. The controller is configured to store a baseline user input for operating the security system, wherein the baseline user input produces a baseline operation of the security system that can monitor for and identify each of a plurality of baseline security events of the facility. The controller is configured to raise an alarm when the controller identifies one or more of the plurality of baseline security events of the facility. The controller is configured to detect an anomaly in the user input relative to the baseline user input, and to determine whether the anomaly in the user input causes the controller to not be able to identify one or more of the plurality of baseline security events of the facility. When the anomaly in the user input causes the controller to not be able to identify one or more of the plurality of baseline security events, the controller is configured to send a proactive threat detection alert to a remote device such as an operator console.

Another example may be found in a method for proactive threat detection in a security system of a facility, wherein the security system includes a controller operatively coupled to a plurality of sensors, wherein each of the plurality of sensors are for detecting a corresponding sensed event of the facility, wherein the controller is configured with a baseline configuration that configures the controller to identify each of a plurality of baseline security events of the facility based at least in part on the sensed events detected by the plurality of sensors. The controller is configured to receive user input for operating the security system including arming and disarming the security system. The method includes receiving a user input and determining whether the user input changes the baseline configuration of the controller such that the controller is no longer able to identify one or more of the plurality of baseline security events. When the user input changes the baseline configuration of the controller such that the controller is no longer able to identify one or more of the plurality of baseline security events, a proactive threat detection alert is provided.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
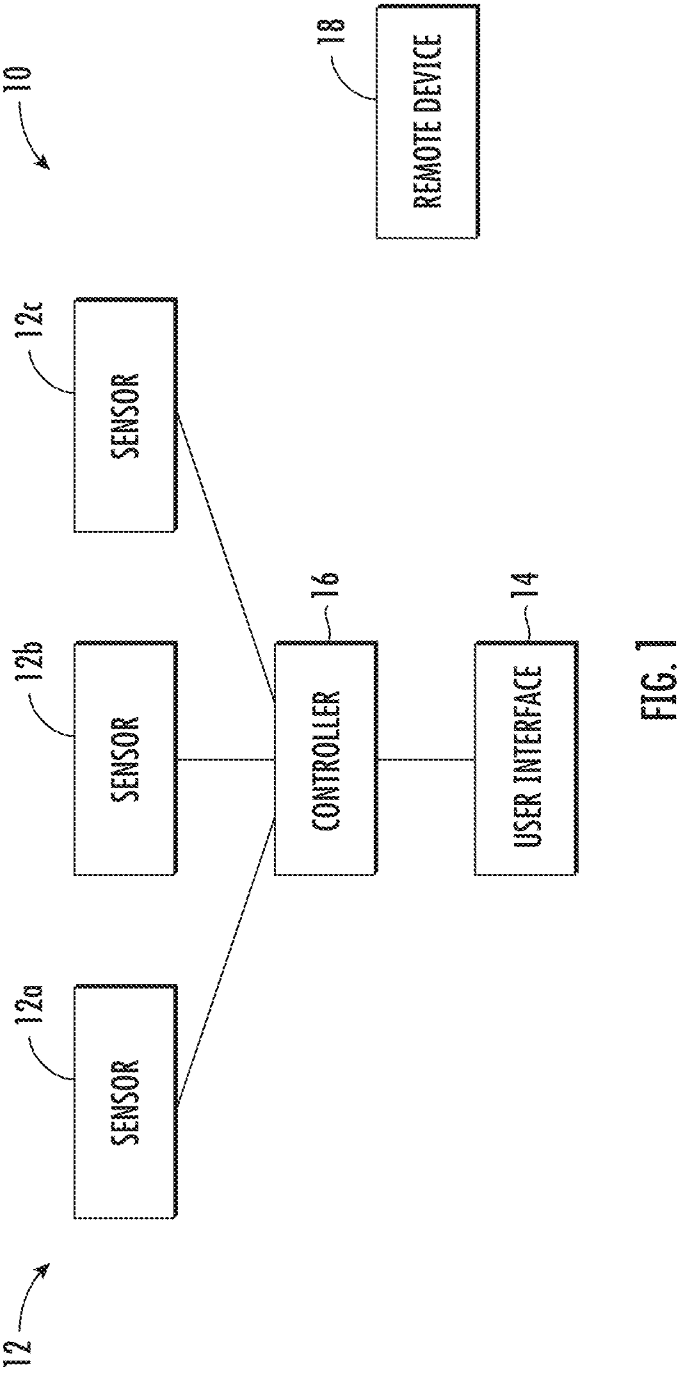
FIG. 1 is a schematic block diagram showing an illustrative security system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative security system 10 that may be deployed within a facility in order to protect part or all of the facility. The illustrative security system 10 includes a plurality of sensors 12 that are each configured to detect a corresponding sensed event of the facility. The sensors 12 are individually labeled as 12*a*, 12*b* and 12*c*. While a total of three sensors 12 are shown, it will be appreciated that the security system 10 may include any number of sensors 12. In some cases, one or more of the sensors 12 may be classified as essential sensors while others of the sensors 12 may be classified as non-essential sensors. In some cases, each of the sensors 12 may be an access control device, a door open sensor, a window open sensor, a motion sensor, a video camera, and/or any other sensor. The illustrative security system 10 includes a user interface 14 that may be used to display information from the security system 10. The user interface 14 may also be used by the security system 10 to solicit and receive information from a user.

A controller 16 is operatively coupled with the sensors 12 and with the user interface 14. The controller 16 is configured to identify security events of the facility based at least in part on the sensed events detected by the sensors 12. The controller 16 is configured to receive user input via the user interface 14 for operating the security system 10, including arming and disarming the security system 10. The user input may also include changing configuration settings of the controller 16, such as sensor bypass settings, automatic arm and disarm configuration settings, configuration settings that defined associations between sensors, schedule settings, and/or any other configuration setting of the controller. The controller 16 is configured to store a baseline user input for operating the security system 10, wherein the baseline user input produces a baseline operation of the security system 10 that can monitor for and identify each of a plurality of baseline security events of the facility. The controller 16 is configured to raise an alarm when the controller 16 identifies one or more of the plurality of baseline security events of the facility. The controller 16 is configured to detect an anomaly in the user input relative to the baseline user input. The controller 16 is configured to determine whether the anomaly in the user input causes the controller 16 to not be able to identify one or more of the plurality of baseline security events of the facility.

When the anomaly in the user input causes the controller 16 to not be able to identify one or more of the plurality of baseline security events, the controller 16 is configured to send a proactive threat detection alert to a remote device 18 to prompt an operator to take action to resolve the anomaly. In some cases, when the anomaly in the user input is determined to not cause the controller 16 to not be able to identify one or more of the plurality of baseline security events, the controller 16 does not provide the proactive threat detection alert to the remote device 18. The remote device 18 may be a computer being used by an operator to monitor operation of the security system 10. The remote device 18 may be a remote server such as a remote cloud-based server. In some cases, the remote device 18 may be part of a building management system, for example. In some cases, the anomaly in the user input may include a manual bypass of one or more of the sensors 12 that are not bypassed under the baseline operation of the security system 10. In some cases, the controller 16 may include an automatic arm and disarm configuration that defines when the security system 10 is automatically armed and when the security system 10 is automatically disarmed, and the anomaly in the user input may include changing the automatic arm and disarm configuration of the controller 16. In some cases, the anomaly in the user input may include a combination of distinct user inputs, such as disarming the security system outside of defined normal business hours followed by motion detected in a highly sensitive area of the facility (e.g. server room, bank vault, etc.), or bypassing certain critical sensors such as perimeter security sensors followed by arming the security system. In some cases, the sensors 12 may include light sensors and/or temperature sensors of a building management system, and the anomaly may include detecting light and/or temperature variations in the facility that do not match baseline light and/or temperature patterns, sometimes in combination anomalous user input.

In some cases, the controller 16 may be configured to identify security events of the facility based at least in part on the sensed events detected by the sensors 12. The controller 16 may also be configured to receive user input for operating the security system 10 including arming and disarming the security system 10. In some cases, the controller 16 may be configured to monitor over time the user input received for operating the security system 10 and to establish a baseline user input for operating the security system 10. The baseline user input produces a baseline operation of the security system that can monitor for and identify each of a plurality of baseline security events of the facility. The controller 16 may be configured to raise an alarm when the security system 10 identifies one or more of the plurality of baseline security events of the facility. The controller 16 may be configured to detect an anomaly in the user input relative to the baseline user input. As an example, the anomaly in the user input may include a manual bypass of one or more of the sensors 12 that are not bypassed under the baseline operation of the security system 10. In some cases, the controller 16 may include an automatic arm and disarm configuration that defines when the security system 10 is automatically armed and when the security system 10 is automatically disarmed, and the anomaly in the user input may include changing the automatic arm and disarm configuration of the controller 16. In some cases, the anomaly in the user input may include disarming the security system 10 at a time that is inconsistent with the baseline user input. In some cases, the anomaly in the user input may include disarming the security system 10 at a time that is anomalous relative to the baseline user input, followed by physical access detected by one or more of the sensors 12 in one or more higher security areas of the facility. In some cases, the controller 16 may include a sensor association configuration that configures an association between two or more of sensors 12, and the anomaly in the user input may include modifying the sensor association configuration. In some cases, the controller 16 may be configured to establish the baseline user input for operating the security system 10 by storing over time the user input received for operating the security system 10, using machine learning to learn a ML model that identifies the baseline user input, and using the ML model to detect the anomaly in the user input relative to the baseline user input.

The controller 16 may be configured to determine whether the anomaly in the user input may cause the security system 10 to not be able to identify one or more of the plurality of baseline security events of the facility. When the anomaly in the user input causes the security system 10 to not be able to identify one or more of the plurality of baseline security events, the controller 16 is configured to provide a proactive threat detection alert. When the anomaly in the user input does not cause the security system 10 to not be able to identify one or more of the plurality of baseline security events, the controller 16 is configured to not provide the proactive threat detection alert.

Figure 2:
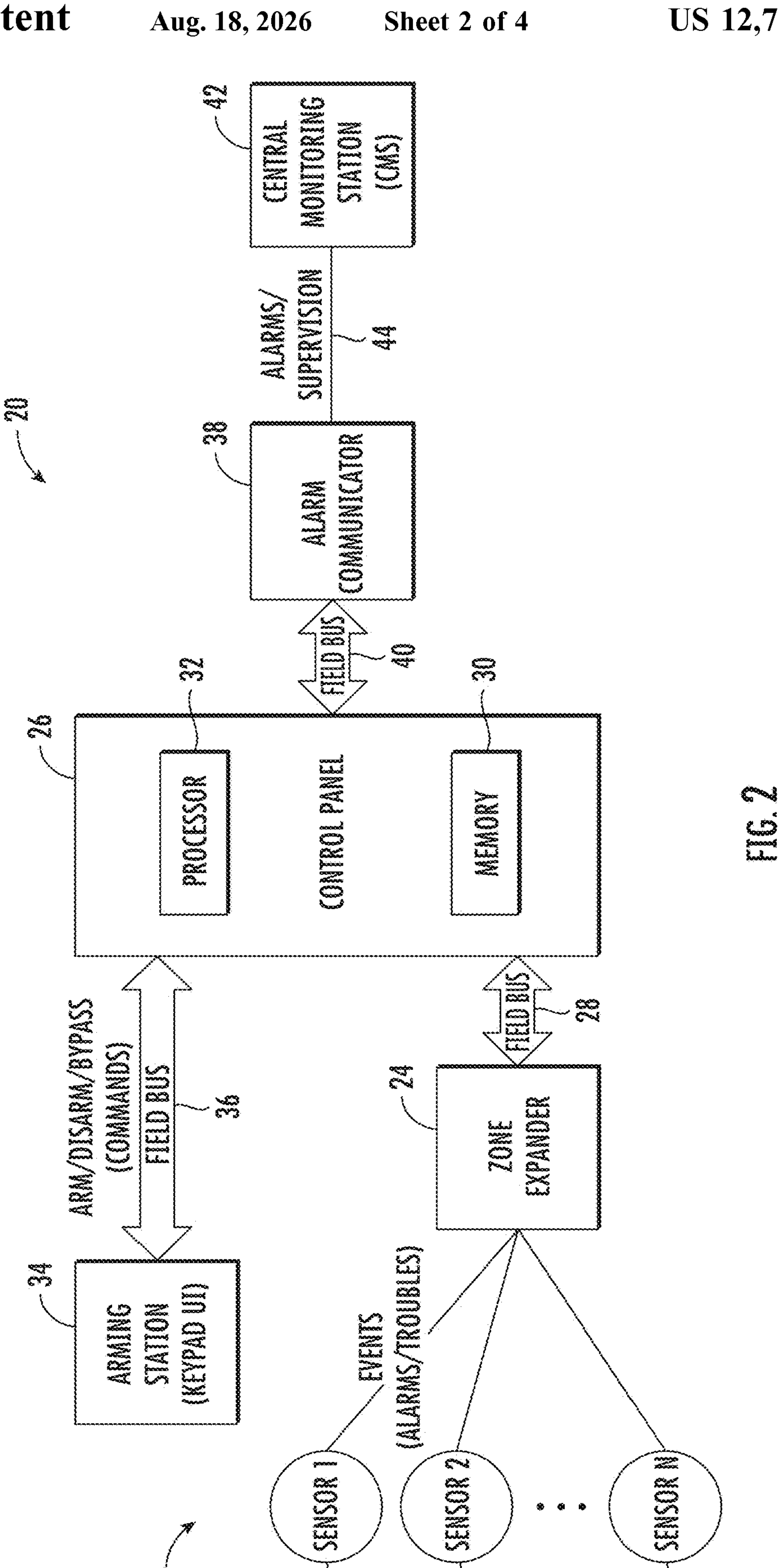
FIG. 2 is a schematic block diagram showing an illustrative security system.

FIG. 2 is a schematic block diagram showing an illustrative security system 20. The illustrative security system 20 may be considered as being an example of the security system 10. The security system 20 includes a number of sensors 22, individually labeled as 22*a*, 22*b* and through 22*n*. The security system 20 may include any number of sensors 22, thus "n" may be any desired integer greater than zero. In this example, each of the sensors 22 communicate with a zone expander 24. In some cases, the zone expander 24 may communicate with a control panel 26 via a field bus 28. The control panel 26 includes a memory 30 and a processor 32, which may be considered as being analogous to the controller 16 shown in FIG. 1.

The control panel 26 may be able to communicate with an arming station 34 via a field bus 36. The arming station 34 may be analogous to the user interface 14 of FIG. 1. In some cases, the arming station 34 may include a keypad that can be used to enter codes to turn the security system 20 on and off, or to arm or disarm the security system 20, for example. Arm commands, disarm commands, bypass commands, configuration change commands and/or other commands may be provided by the arming station 34 to the control panel 26 via the field bus 36. The control panel 26 is able to communicate with an alarm communicator 38 via a field bus 40. The alarm communicator 38 is coupled with a Central Monitoring Station (CMS) 42 via a connection 44. In some cases, the connection 40 may be a network connection that can include the Internet. The control panel 26 is thus able to communicate with the CMS 42.

Figure 3:
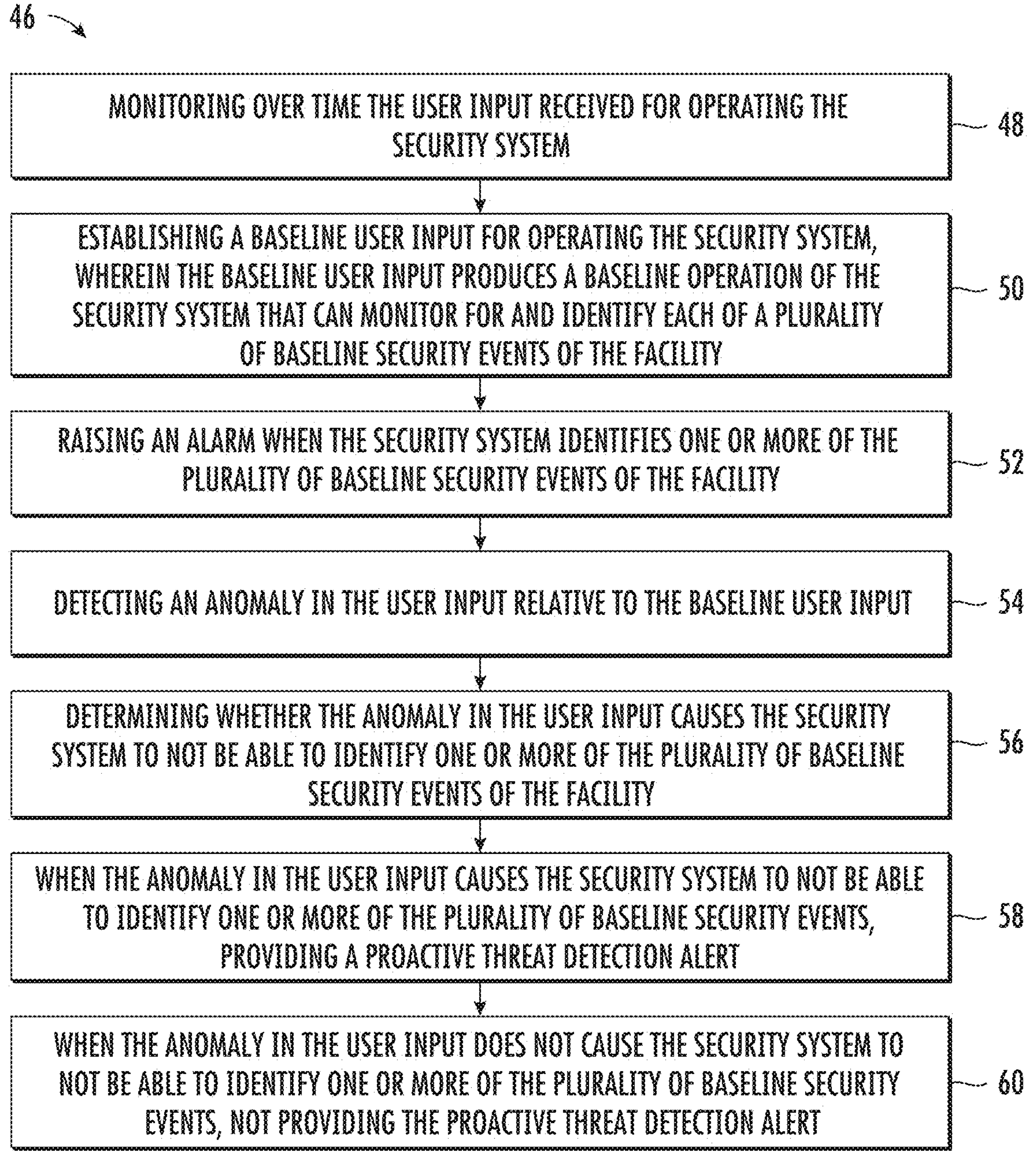
FIG. 3 is a flow diagram showing an illustrative method for proactive threat detection in a security system.

FIG. 3 is a flow diagram showing an illustrative method 46 for proactive threat detection in a security system (such as the security system 10) of a facility, wherein the security system includes a controller (such as the controller 16) operatively coupled to a plurality of sensors (such as the sensors 12), wherein each of the plurality of sensors are for detecting a corresponding sensed event of the facility. The controller is configured to identify security events of the facility based at least in part on the sensed events detected by the plurality of sensors. The controller is also configured to receive user input for operating the security system including arming and disarming the security system. The illustrative method includes monitoring over time the user input received for operating the security system, as indicated at block 48. A baseline user input for operating the security system is established, wherein the baseline user input produces a baseline operation of the security system that can monitor for and identify each of a plurality of baseline security events of the facility, as indicated at block 50. An alarm is raised when the security system identifies one or more of the plurality of baseline security events of the facility, as indicated at block 52. An anomaly in the user input is detected relative to the baseline user input, as indicated at block 54. A determination is made as to whether the anomaly in the user input causes the security system to not be able to identify one or more of the plurality of baseline security events of the facility, as indicated at block 56. When the anomaly in the user input causes the security system to not be able to identify one or more of the plurality of baseline security events, a proactive threat detection alert is provided, as indicated at block 58. When the anomaly in the user input does not cause the security system to not be able to identify one or more of the plurality of baseline security events, the proactive threat detection alert is not provided, as indicated at block 60.

In some cases, the anomaly in the user input may include a manual bypass of one or more of the plurality of sensors that are not bypassed under the baseline operation of the security system. In some instances, the plurality of sensors of the security system may include one or more sensors that are classified as essential sensors and one or more sensors that are classified as non-essential sensors, and the anomaly in the user input may include a manual bypass of one or more of the essential sensors. The anomaly in the user input may include a manual bypass of one or more of the essential sensors followed by arming the security system. In some cases, the controller may include an automatic arm and disarm configuration that defines when the security system is automatically armed and when the security system is automatically disarmed, and the anomaly in the user input may include changing the automatic arm and disarm configuration of the controller. In some cases, the proactive threat detection alert may be provided across a network to a central monitoring station to alert an operator of the central monitoring station.

In some cases, the anomaly in the user input may include disarming the security system at a time that is inconsistent with the baseline user input. In some cases, the anomaly in the user input may include disarming the security system at a time that is anomalous relative to the baseline user input, followed by physical access detected by one or more of the plurality of sensors in one or more higher security areas of the facility. In some cases, the controller may include a sensor association configuration that configures an association between two or more of the plurality of sensors, and the anomaly in the user input may include modifying the sensor association configuration. An example sensor association may be between a motion sensor and a video camera, where motion detected by the motion sensor triggers recording of the video captured by the video camera. Another example sensor association may be between two motion sensors, where motion detected by one of the motion sensors must be followed by motion detected by the other motion sensor within a predetermined period of time, otherwise an alarm is triggered. These are just examples sensor associations. In some cases, establishing the baseline user input for operating the security system may include storing over time the user input received for operating the security system, using machine learning to learn a ML model that identifies the baseline user input, and using the ML model to detect the anomaly in the user input relative to the baseline user input. In some cases, the baseline security events do not include all of the security events that can be detected during the baseline operation of the security system, but rather are a predefined subset of the baseline security events that can be detected during the baseline operation of the security system.

Figure 4:
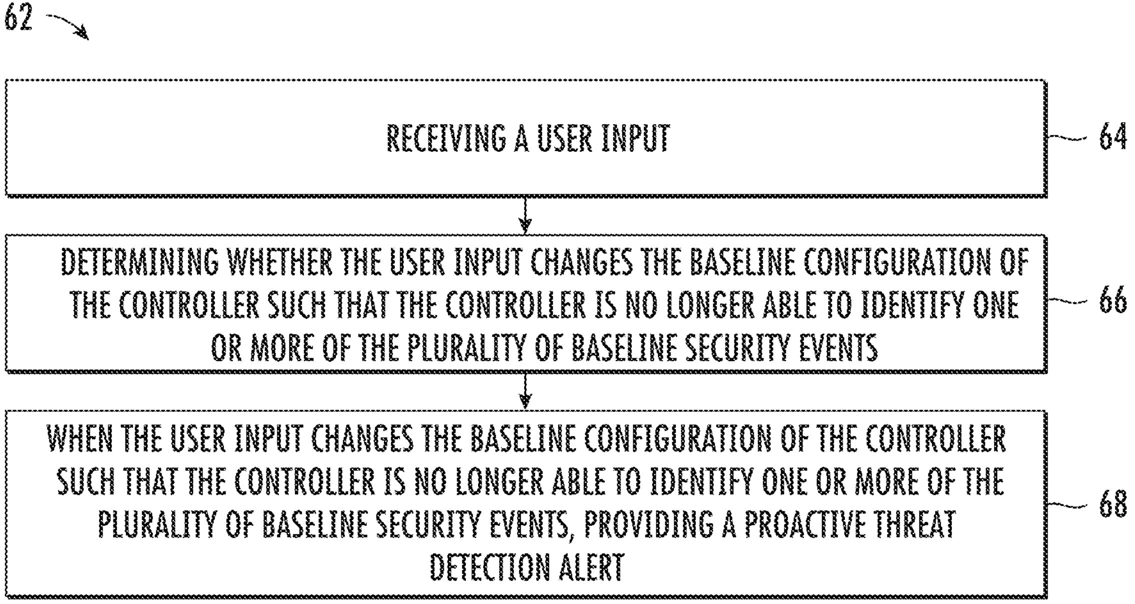
FIG. 4 is a flow diagram showing an illustrative method for proactive threat detection in a security system.

FIG. 4 is a flow diagram showing an illustrative method 62 for proactive threat detection in a security system (such as the security system 10) of a facility, wherein the security system includes a controller (such as the controller 16) operatively coupled to a plurality of sensors (such as the sensors 12), wherein each of the plurality of sensors are for detecting a corresponding sensed event of the facility. The controller is configured with a baseline configuration that configures the controller to identify each of a plurality of baseline security events of the facility based at least in part on the sensed events detected by the plurality of sensors. The controller is further configured to receive user input for operating the security system including arming and disarming the security system. The illustrative method includes receiving a user input, as indicated at block 64. A determination is made as to whether the user input changes the baseline configuration of the controller such that the controller is no longer able to identify one or more of the plurality of baseline security events, as indicated at block 66. When the user input changes the baseline configuration of the controller such that the controller is no longer able to identify one or more of the plurality of baseline security events, the method 62 includes providing a proactive threat detection alert, as indicated at block 68.

In some cases, the user input may change the baseline configuration of the controller such that the controller is no longer able to identify one or more of the plurality of baseline security events when the user input configures one or more of the plurality of sensors to be bypassed that are not bypassed under the baseline configuration. In some cases, the user input may change the baseline configuration of the controller such that the controller is no longer able to identify one or more of the plurality of baseline security events when the user input configures one or more of the plurality of sensors to be bypassed that are not bypassed under the baseline configuration, followed by arming the security system. In some cases, the plurality of sensors of the security system may include one or more sensors that are classified as essential sensors and one or more sensors that are classified as non-essential sensors, and wherein the user input changes the baseline configuration of the controller such that the controller is no longer able to identify one or more of the plurality of baseline security events when the user input configures one or more of the essential sensors to be bypassed. Changes to the baseline configuration may include, for example, sensor bypass settings, automatic arm and disarm configuration settings, configuration settings that defined associations between sensors, schedule settings, and/or any other configuration setting of the controller.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method comprising:

providing proactive threat detection in a security system of a facility, wherein the security system includes a controller operatively coupled to a plurality of sensors and to a user interface, wherein each of the plurality of sensors are for detecting a corresponding sensed event of the facility, wherein the controller is configured to identify security events of the facility based at least in part on the sensed events detected by the plurality of sensors, and wherein the controller is configured to receive user input for operating the security system including arming and disarming the security system, the method further comprising:

monitoring over time the user input received from the user interface for operating the security system;

establishing a baseline user input for operating the security system based on the user input received from the user interface, wherein the baseline user input produces a baseline operation of the security system that can monitor and identify each of a plurality of baseline security events of the facility;

raising an alarm based on identification of one or more of the plurality of baseline security events of the facility;

detecting an anomaly in the user input received at the controller relative to the baseline user input, wherein the anomaly in the user input causes the security system to not be able to identify one or more of the plurality of baseline security events of the facility; and providing a proactive threat detection alert based on the detection of the anomaly in the user input received at the controller.

2. The method of claim 1, wherein the anomaly in the user input comprises a manual bypass of one or more of the plurality of sensors that are not bypassed under the baseline operation of the security system.

3. The method of claim 2, wherein the plurality of sensors of the security system comprises one or more sensors that are classified as essential sensors and one or more sensors that are classified as non-essential sensors, and wherein the anomaly in the user input comprises a manual bypass of one or more of the essential sensors.

4. The method of claim 2, wherein the plurality of sensors of the security system comprises one or more sensors that are classified as essential sensors and one or more sensors that are classified as non-essential sensors, and wherein the anomaly in the user input comprises a manual bypass of one or more of the essential sensors followed by arming the security system.

5. The method of claim 1, wherein the controller comprises an automatic arm and disarm configuration that defines when the security system is automatically armed and when the security system is automatically disarmed, wherein the anomaly in the user input comprises changing the automatic arm and disarm configuration of the controller.

6. The method of claim 1, wherein the anomaly in the user input comprises disarming the security system at a time that is in consistent with the baseline user input.

7. The method of claim 1, wherein the anomaly in the user input comprises disarming the security system at a time that is anomalous relative to the baseline user input, followed by physical access detected by one or more of the plurality of sensors in one or more higher security areas of the facility.

8. The method of claim 1, wherein the plurality of sensors comprise one or more of an access control device, a door open sensor, a window open sensor, a motion sensor and a video camera.

9. The method of claim 8, wherein the controller comprises a sensor association configuration that configures an association between two or more of the plurality of sensors, and wherein the anomaly in the user input comprises modifying the sensor association configuration.

10. The method of claim 1, wherein the proactive threat detection alert is provided across a network to a central monitoring station to alert an operator of the central monitoring station.

11. The method of claim 1, wherein establishing the baseline user input for operating the security system comprises:

storing over time the user input received for operating the security system;

using machine learning to learn a ML model that identifies the baseline user input; and using the ML model to detect the anomaly in the user input relative to the baseline user input.

12. A security system for a facility, comprising:

a plurality of sensors each for detecting a corresponding sensed event of the facility;

a user interface;

a controller operatively coupled to a plurality of sensors and the user interface, wherein the controller is configured to identify security events of the facility based at least in part on the sensed events detected by the plurality of sensors, and wherein the controller is configured to receive user input via the user interface for operating the security system including arming and disarming the security system, the controller configured to:

store a baseline user input for operating the security system, wherein the baseline user input produces a baseline operation of the security system that can monitor and identify each of a plurality of baseline security events of the facility;

raise an alarm when the controller identifies one or more of the plurality of baseline security events of the facility;

detect an anomaly in the user input received at the controller and relative to the baseline user input;

determine whether the anomaly in the user input causes the controller to not be able to identify one or more of the plurality of baseline security events of the facility; and when the anomaly in the user input causes the controller to not be able to identify one or more of the plurality of baseline security events, send a proactive threat detection alert to a remote device.

13. The security system of claim 12, wherein when the anomaly in the user input does not cause the controller to not be able to identify one or more of the plurality of baseline security events, not providing the proactive threat detection alert to the remote device.

14. The security system of claim 12, wherein the anomaly in the user input comprises a manual bypass of one or more of the plurality of sensors that are not bypassed under the baseline operation of the security system.

15. The security system of claim 12, wherein the controller includes an automatic arm and disarm configuration that defines when the security system is automatically armed and when the security system is automatically disarmed, wherein the anomaly in the user input comprises changing the automatic arm and disarm configuration of the controller.

16. A method comprising:

providing proactive threat detection in a security system of a facility, wherein the security system includes a controller operatively coupled to a plurality of sensors, wherein each of the plurality of sensors are for detecting a corresponding sensed event of the facility, wherein the controller is configured with a baseline configuration that configures the controller to identify each of a plurality of baseline security events of the facility based at least in part on the sensed events detected by the plurality of sensors, and wherein the controller is configured to receive user input for operating the security system including arming and disarming the security system, the method further comprising:

receiving a user input at the controller;

determining that the user input changes the baseline configuration of the controller such that the controller is no longer able to identify one or more of the plurality of baseline security events; and providing a proactive threat detection alert based on the determination that the changes to the baseline configuration are such that the controller is no longer able to identify the one or more of the plurality of baseline security events.

17. The method of claim 16, wherein the user input changes the baseline configuration of the controller such that the controller is no longer able to identify one or more of the plurality of baseline security events when the user input configures one or more of the plurality of sensors to be bypassed that are not bypassed under the baseline configuration.

18. The method of claim 16, wherein the user input changes the baseline configuration of the controller such that the controller is no longer able to identify one or more of the plurality of baseline security events when the user input configures one or more of the plurality of sensors to be bypassed that are not bypassed under the baseline configuration, followed by arming the security system.

19. The method of claim 16, wherein the plurality of sensors of the security system comprises one or more sensors that are classified as essential sensors and one or more sensors that are classified as non-essential sensors, and wherein the user input changes the baseline configuration of the controller such that the controller is no longer able to identify one or more of the plurality of baseline security events when the user input configures one or more of the essential sensors to be bypassed.

* * * * *